(12) United States Patent
Runkle

(10) Patent No.: US 6,227,591 B1
(45) Date of Patent: May 8, 2001

(54) DUAL ALLOY RAILROAD WHEEL

(75) Inventor: Joseph C. Runkle, Manchester-by-the-Sea, MA (US)

(73) Assignee: Ultraclad Corporation, Andover, MA (US)

( * ) Notice: Subject to any disclaimer, the term of this patent is extended or adjusted under 35 U.S.C. 154(b) by 0 days.

(21) Appl. No.: 09/465,107

(22) Filed: Dec. 16, 1999

Related U.S. Application Data

(63) Continuation of application No. 09/167,791, filed on Oct. 7, 1998.
(60) Provisional application No. 60/061,610, filed on Oct. 10, 1997.

(51) Int. Cl.[7] ................................................. B60B 37/00
(52) U.S. Cl. ................................................. 295/15; 295/17
(58) Field of Search .............................. 295/1, 8, 11, 15, 295/17

(56) References Cited

U.S. PATENT DOCUMENTS

| 725,999 | 4/1903 | Slattery | 295/8 |
|---|---|---|---|
| 856,675 | 6/1907 | Blair, Jr. | 295/8 |
| 925,394 | 6/1909 | Slattery | 295/8 |
| 950,500 | 3/1910 | Woods | 295/8 |
| 950,501 | 3/1910 | Woods | 295/8 |
| 3,978,712 | 9/1976 | Cowan et al. | 73/6.75 R |
| 4,183,456 | 1/1980 | Shilling et al. | 228/175 |
| 4,426,236 | 1/1984 | Sugino et al. | 148/36 |
| 5,290,507 | 3/1994 | Runkle | 419/14 |
| 5,312,075 | 5/1994 | Kuhn | 246/455 |
| 5,496,004 | 3/1996 | Kuhn | 246/470 |
| 5,531,943 | 7/1996 | Sudani et al. | 264/29.1 |
| 5,629,101 | 5/1997 | Watremez | 428/701 |

FOREIGN PATENT DOCUMENTS 7802742    11/1982  (SE) .

*Primary Examiner*—Russell D. Stormer
(74) *Attorney, Agent, or Firm*—Nutter, McClennen & Fish, LLP

(57) ABSTRACT

A railroad wheel formed from at least two metallic alloys. In one embodiment, a railroad wheel has a body formed from a first alloy and a rim formed from a second alloy initially in powder form. In an exemplary embodiment, to form the dual alloy wheel the body of the wheel is cast with a circumferential channel formed therein. The perimeter of the body is enveloped with a material, such as sheet metal, to form a cavity defined by the channel and the sheet metal. The second alloy in the form of a powder is placed in the cavity and subjected to heat and pressure to metallurgically weld the first and second alloys and form a composite railroad wheel.

10 Claims, 3 Drawing Sheets

DUAL ALLOY RAILROAD WHEEL

CROSS REFERENCE TO RELATED APPLICATION

This is a continuation of application Ser. No. 09/167,791 filed Oct. 7, 1998.

This application claims priority from U.S. Provisional Application No. 60/061,610, filed on Oct. 10, 1997.

STATEMENT REGARDING FEDERALLY SPONSORED RESEARCH

Not Applicable.

FIELD OF THE INVENTION

The present invention relates to composite metallic articles, and more particularly to a dual alloy railroad wheel.

BACKGROUND OF THE INVENTION

The vast majority of railroad wheels in use today are formed entirely from 0.6 to 0.7 percent plain carbon steel cast in permanent graphite molds. Although formed from a single material, the railroad wheels have different portions that are subjected to different stresses during use and ideally should have different characteristics. For example, the rim of a railroad wheel is in continuous contact with a railroad track and should have good wear resistance. In general, both the rim and body should resist wear and fatigue, but the required wear resistance properties of the rim can compromise the desired level of fatigue resistance of the body portion. Similarly, the desired level of fatigue resistance of the body can reduce the rim wear resistance.

In an attempt to achieve the desired characteristics for the rim and body portions formed from a single material, these portions are processed differently. Conventional railroad wheel fabrication includes processing the rim portion of the wheel through a quenching process. That is, the rim is austenitized at a temperature in a range from about 1700 degrees to 1800 degrees Fahrenheit by rapid cooling with a liquid, such as water spray. The rim quenching process provides a fine perlitic microstructure for the steel and a desirable residual compressive state of stress in the rim about a circumference of the wheel. The fine perlitic structure is harder, and thus generally is more resistant to wear than coarser microstructures and the residual compressive stress on the wheel rim resists cracking due to fatigue and other stresses.

While quenching the rim portion of the wheel provides some contrast in the properties of the body and rim portions of the wheel, there is a limit to the different characteristics that a single material can achieve. Furthermore, there is an inherent tradeoff that is made to balance the desired properties of the different wheel portions.

In addition to providing differing characteristics for the rim and body of the wheel, a fabrication process for making the railroad wheel should be readily adaptable to provide a wheel rim having high traction or low traction depending upon the intended application. For example, a wheel for a locomotive should have a relatively high coefficient of friction with respect to a railroad track for enhancing the load pulling characteristics of the locomotive. Conversely, a freight car should have wheels with a relatively low coefficient of friction for more efficient transport of the freight car.

It would be therefore be desirable to provide a railroad wheel having enhanced wear properties, resistance to fatigue, shelling, and hot spotting. It is further desirable to provide a railroad wheel that can be readily fabricated for relatively high and low traction applications.

SUMMARY OF THE INVENTION

The present invention provides a composite metallic article having enhanced resistance to wear and fatigue. Although the article is primarily shown and described in conjunction with a dual alloy railroad wheel, it is understood that the present invention is applicable to a variety of articles.

In one embodiment, the present invention provides a metallic composite railroad wheel formed from at least two different alloys with each of the alloys having particular properties suited for different portions of the composite article. In an exemplary embodiment, the railroad wheel has a body portion formed from a first alloy and a rim portion formed from a second alloy.

Although it is understood that the rim and wheel body should both be resistant to wear and fatigue, one of ordinary skill in the art will appreciate that a primary characteristic for the first alloy, i.e., the body, is resistance to fatigue cracking and a primary characteristic of the second alloy, i.e., the rim, is resistance to wear. The dual alloy railroad wheel of the present invention provides a wheel with the particular properties that are desired for each of the body and rim portions of the wheel.

In an exemplary embodiment, a method for making a composite railroad wheel of the invention includes casting or forging the body portion from a first alloy steel. A circumferential channel is formed about a perimeter of the body portion. A material, such as sheet metal, is secured about the body portion to form a cavity between the sheet metal and a surface of the body. The cavity is then filled with a second alloy steel powder having desired properties. The cavity is evacuated and hermetically sealed to form a wheel assembly.

The wheel assembly is heated and placed in a hot isostatic press. The wheel assembly is then pressurized with a gas which operates in conjunction with the elevated temperature to densify and diffusion weld the alloy powder to the body portion and provide the rim portion of the wheel. The formed article is then cooled to form the dual alloy railroad wheel.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention provides a dual alloy article that offers optimized properties required for different portions of the article. In one embodiment, a railroad wheel is formed from first and second alloys. However, it is understood that the invention is applicable to a variety of composite articles. It is further understood that additional alloys can be used to form the railroad wheel of the present invention.

Figure 1:
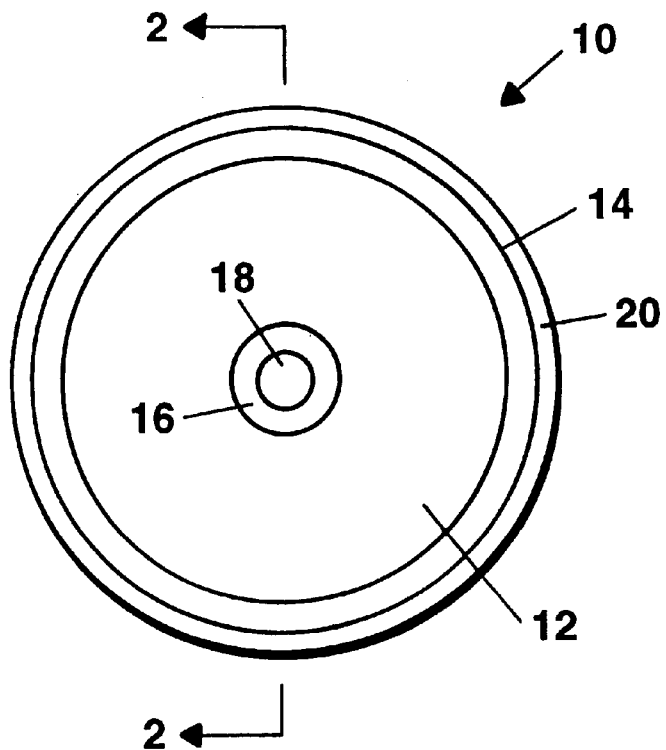
FIG. 1 is a side view of a railroad wheel in accordance with the present invention.
Figure 2:
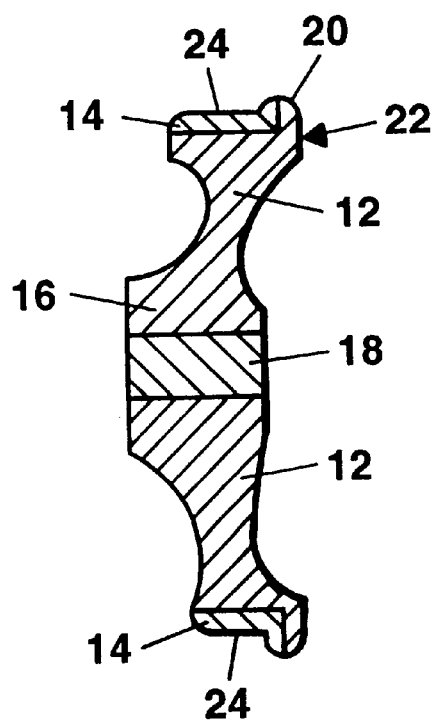
FIG. 2 is a cross sectional view of the railroad wheel of FIG. 1 along lines 2—2.

FIGS. 1 and 2 show a dual alloy railroad wheel 10 in accordance with the present invention. The wheel 10 includes a body 12 with a rim 14 extending about the circumference of the body. The body 12 has a hub 16 having a bore 18 therethrough for receiving an axle. It is understood that in use, wheels are secured to opposing ends of an axle with the wheels spaced to rotatably contact parallel railroad tracks. The rim 14 defines a surface 24, generally about five inches in width, adapted for contact with the railroad track. A flange 20 extends radially outward from an inner portion 22 of the rim for retaining the wheels on the railroad tracks.

Figure 3:
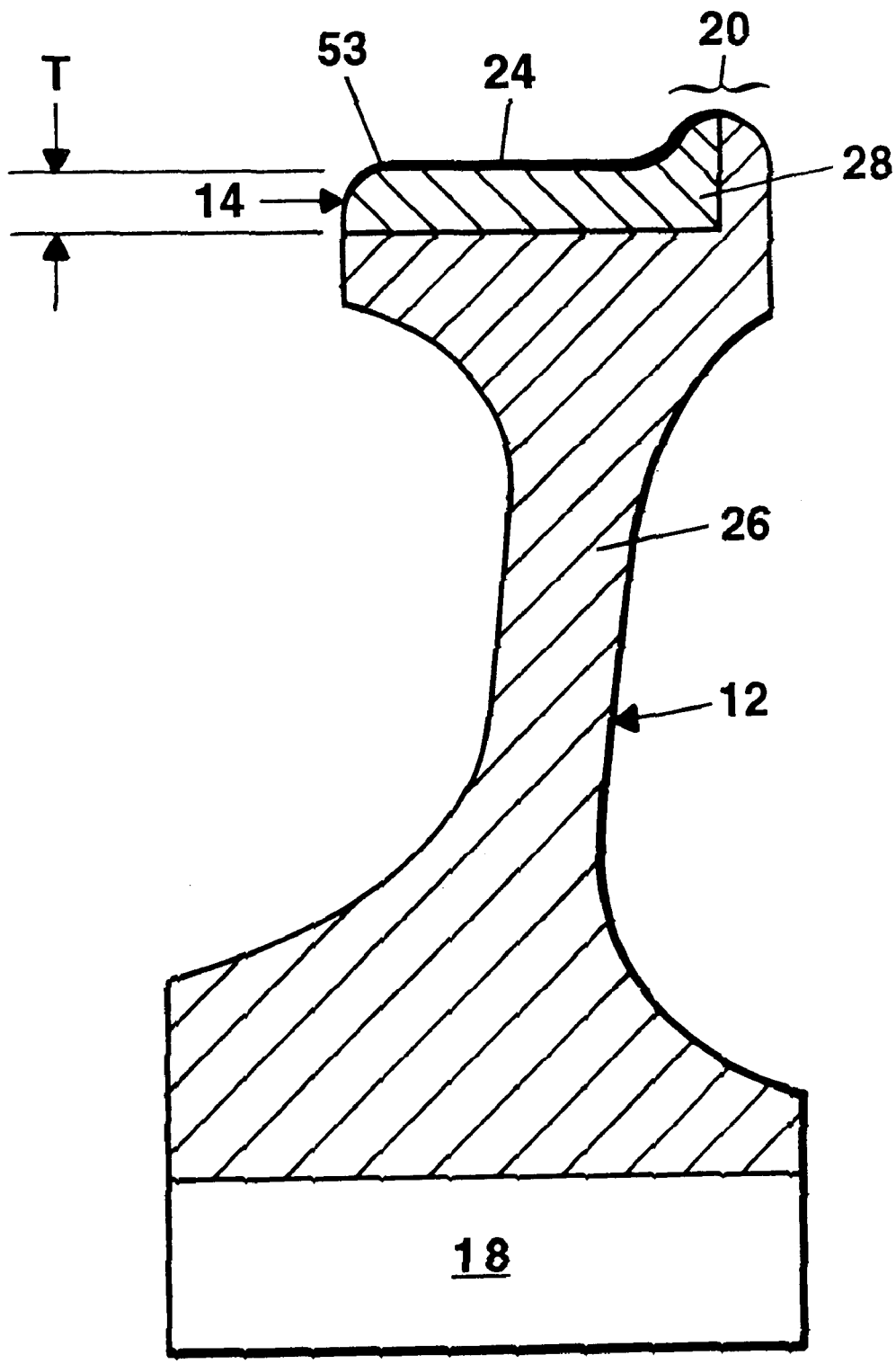
FIG. 3 is a cross sectional view of a portion of the railroad wheel of FIG. 1.

FIG. 3 shows a portion of the wheel 12 of FIG. 2 in more detail. The body 12 is formed from a first alloy 26 and the rim 14 is formed from a second alloy 28. The body 12 and rim 14 interface can be formed in a variety of configurations. For example, the body 12 and rim interface can be constant across the wheel circumference or can vary in one or more dimensions. That is, the interface can undulate or taper in either direction such a thickness T of the rim 14 varies across the circumference of the wheel. In a preferred embodiment, the rim 14 and body 12 form a generally planar interface, with the thickness T of the second alloy 28 ranging from about 0.25 to about 1.00 inches, and preferably about 0.50 inches.

The flange 20 can be formed in a variety of configurations. While the flange 20 can comprise varying proportions of the first and second alloys or a third alloy, the inner, track-contacting surface should be highly resistant to wear. In one embodiment, the inner portion of the flange 20 is formed from the second alloy to provide the required wear resistance. In another embodiment, at least a portion of the flange 20 is formed from a third alloy to provide a flange having a wear resistance greater than the rim 14. In a preferred embodiment, the flange 20 is formed in part by the first alloy 26 and in part by the second alloy 28. The second alloy forms the inner side of the flange with the depth of the second alloy along the circumference of the rim ranging from about 0.25 inch to about 0.50 inch.

The body 12 is formed from a first metal alloy 26 having superior resistance to fatigue. The first alloy can be selected from a variety of steels such as about 0.6 percent to about 0.7 percent plain carbon steel, AISI 8620 steel, AISI 4140 steel, and AISI 4340 steel. One preferred steel is AISI 4140 steel.

The body 12 formed from the first alloy 26 resists fatigue cracking to provide a long useful life for the wheel with enhanced safety. As is known to one of ordinary skill in the art, fatigue cracks in a wheel are often not readily detectable. Total wheel failure due to fatigue cracking is known to have caused train derailments and is therefore an important safety concern in railroad operation.

The rim 14 of the wheel is formed from a second alloy 28 having superior wear resistance. In an exemplary embodiment, the second alloy is a steel that is initially provided in powder form. The second alloy should provide the required wear resistance and resist spotting or shelling. Hot spotting, or shelling, occurs as the wheel momentarily slides on the track which generates a localized heat build up as high as 1100 degrees Celsius. This spot on the wheel rapidly cools to form a hard untempered martensite which can subsequently spell off and create a flat spot on the wheel. Various alloys having the desired properties include high speed tool steels, such as AISI M4 steel (composition of 1.3 percent C, 0.30 percent Mn, 0.30 percent Si, 4.00 percent Cr, 4.00 percent V, 5.50 percent W, and 4.50 percent Mo.), AISI T15 steel, 300 series stainless steel or nickel alloy matrix steels, PH series stainless steels, ferretic stainless steels, crucible CPM 9V, 10V and 15V vanadium carbide containing tool steels, D2 type chromium carbide containing tool steels, and CARPENTER AERMET 100.

A preferred material is selected depending upon the intended use for the wheel. That is, a relatively high traction wheel for a locomotive is formed from an alloy suited for that use. Similarly, a relatively low traction wheel is formed from an alloy having the desired characteristics.

For a wear resistant wheel rim (i.e., freight car wheel), a preferred material is a high speed tool steels such as AISI M4 steel.

A preferred second alloy material for a high traction railroad wheel is 300 series stainless steel.

The rim 14, i.e., the second alloy 28, resists wear to provide a railroad wheel with an extended useful life that resists hot spotting and shelling. In addition, the composition of the rim can be tailored to provide a railroad wheel having a relatively high friction (traction for a locomotive) and relatively low friction (for a freight carrying car). In addition to selecting a particular alloy, other materials can be added to the second alloy 28 to further increase wear resistance and increase traction properties.

In one embodiment, carbide and/or oxide particles are added to the second alloy 28 to increase wear resistance of the rim surface 24. See, for example, U.S. Pat. No. 5,290,507, incorporated by reference herein. Such particles include tungsten carbide and titanium carbide particles having a diameter ranging from about 10 to 300 micrometers in diameter.

In another embodiment, relatively large alloy particles (i.e., 100 to 1000 micrometers in diameter), such as alloy steel, stainless steel, nickel alloy, chromium containing from about ten to about thirty percent stainless steel and/or tool steel, and cobalt alloy particles are added to the second alloy 28 to improve traction of the wheel on a railroad track. Improved traction is particularly useful for a locomotive used to pull rolling stock. In a preferred embodiment, stainless steel particles are added to the second alloy to provide a high traction wheel.

The dual alloy railroad wheel is described as being formed in an exemplary sequence of fabrication steps. It is understood, however, that one of ordinary skill in the art can readily modify one of more of the steps, and/or the sequence of steps, without departing from the invention.

Figure 4:
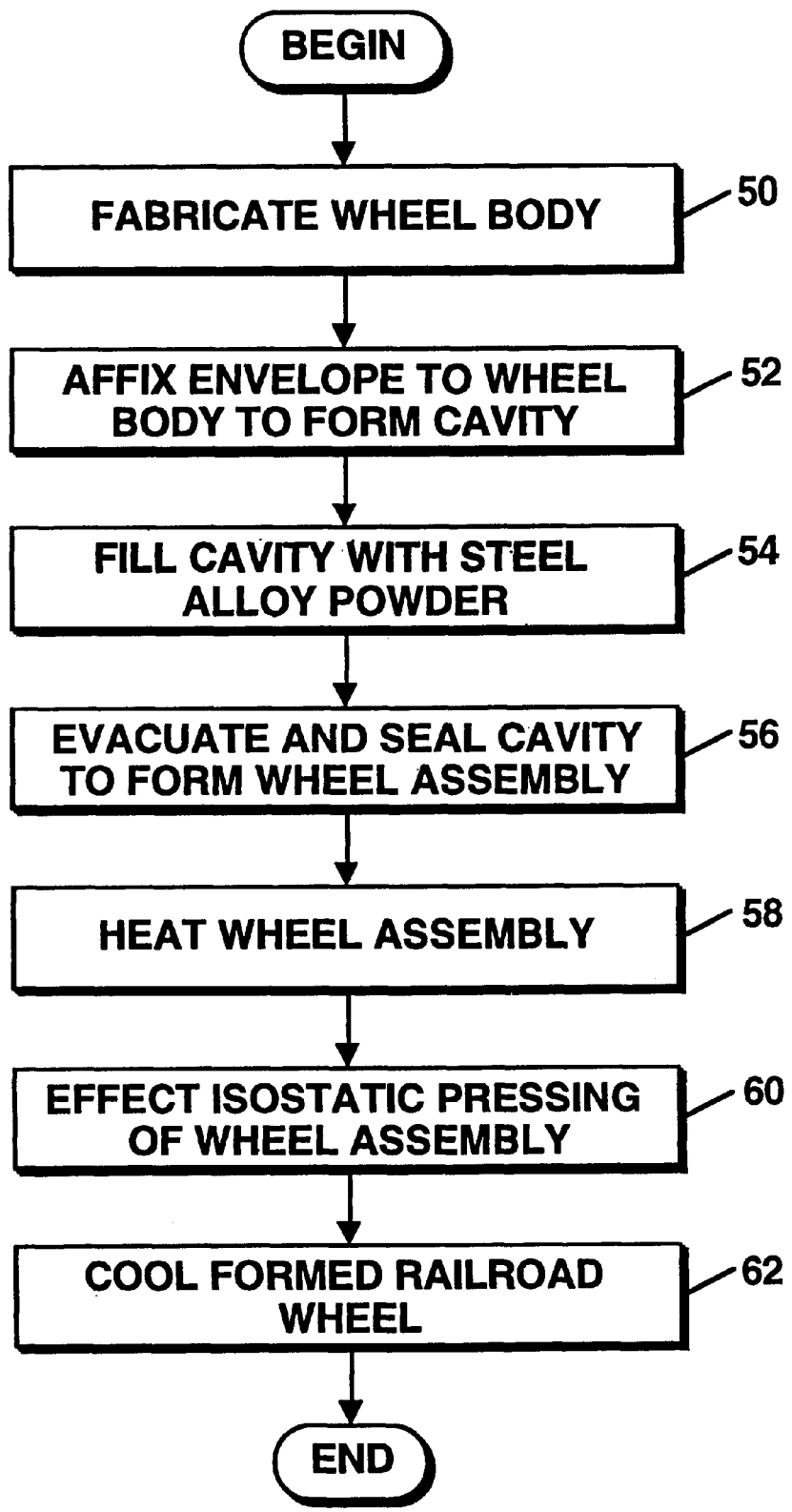
FIG. 4 is a flow diagram of exemplary process steps for fabricating a railroad wheel in accordance with the present invention.

FIG. 4 sets forth an illustrative sequence of steps used to form a dual alloy railroad wheel in accordance with the present invention. The steps refer to wheel components described above and shown in one or more of FIGS. 1–3.

As shown in step 50, the body 12 of the wheel is formed by casting or forging the first alloy 26 into a desired shape using methods well known to one of ordinary skill in the art. As described above, one material for the first alloy is about 0.6 percent to about 0.7 percent plain carbon steel. Along the circumference of the wheel, a channel or recess is formed which is ultimately filled with the second alloy 28. The channel has a width that can range from about 3.0 inches to about 5.5 inches and a depth that can range from about 0.25 inch to about 1.50 inch.

In step 52, an envelope 53 (FIG. 3) is formed and secured about the circumference of the wheel to form a cavity defined by the envelope and surface of the body 12 and a portion of the flange 20 formed by the first alloy. The envelope 53 can be formed from a variety of materials such as low carbon steel. In one embodiment, steel sheet metal is used to form envelope 53. The envelope can be affixed to the body with a variety of techniques including welding and brazing. In one embodiment this sheet metal is welded to welding tabs that are integrally formed with the body or forged into the body.

In step 54, the second alloy 28, in powdered form, is placed in the formed cavity. As described above, one material for the second alloy is AISI M4 high speed tool steel. Additional steel alloys and/or particles can be added to achieve the desired wear and traction characteristics for the rim, as described above. In a preferred embodiment, tungsten carbide particles (e.g., at about thirty percent by volume) are added to the second alloy.

The cavity is then evacuated and hermetically sealed, as shown in step 56, to form a wheel assembly including the body 12 having the cavity filled with the second alloy in powdered form. In step 58, the wheel assembly is heated to a temperature that can range from about 2000 degrees to about 2500 degrees Fahrenheit until the body 12 and the powdered second alloy are of a substantially uniform temperature. The wheel assembly is heated with an electric or gas fired furnace. In step 60, the heated wheel assembly is subjected to hot isostatic pressing at a temperature ranging from about 2000 degrees to about 2350 degrees Fahrenheit at a pressure ranging from about 1000 psi to about 45,000 psi, and preferably about 15,000 psi. The gas used to pressure the wheel assembly is selected from a variety of inert gases including nitrogen, argon, helium and mixtures thereof. A preferred gas is nitrogen.

The elevated pressure and temperature densify and diffusion weld the first and second alloys 26,28 together. That is, the rim 14 is metallurgically welded to the body 12 as the powder transforms to a solid mass. This process provides a composite wheel with virtually no porosity and a weld having a strength essentially equal to a single alloy article.

It will be appreciated that the heat supplied to the body 12 before isostatic pressing forms a heat reservoir for supplying heat energy to the second alloy powder. In conventional hot isostatic pressing, heating is done within a vessel with an electric furnace having molybdenum heating elements which require argon gas to be used. Where the powder is heated from the already heated body, inexpensive nitrogen gas can used to pressure the wheel assembly. In an exemplary embodiment, the second alloy powder comprises less than twenty percent of the wheel by weight. Thus, the heated body 12 advantageously supplies significant heat to the powdered second alloy. It is understood that in conventional hot isostatic pressing there is no such heat transfer since generally there is only powder and no solid body to supply stored heat energy.

The formed railroad wheel is cooled in step 62. Cooling of the wheel can be effected in various methods. In one embodiment, the wheel is removed from the isostatic press and the rim 14 force cooled with a stream of cooled liquid or gas. Force cooling of the rim 14 results in a desired residual compression of the rim about the body 12.

In another embodiment, the wheel is uniformly cooled. A state of residual compression can be achieved by selecting first and second alloys to obtain the desired compression. For example, a body formed from about 0.6 percent to about 0.7 percent plain carbon steel and a rim formed from M4 steel provide a state of residual compression after uniform cooling. The second alloy undergoes a full or partial martensitic transformation while the first alloy (body) transforms to ferrite.

One of ordinary skill in the art will realize further features and advantages of the invention from the above-described embodiments. Accordingly, the invention is not to be limited by what has been particularly shown and described. All references cited herein are expressly incorporated by reference in their entirety.

What is claimed is:

1. A railroad wheel, comprising:
   an inner body portion formed from a first metal alloy; and
   an outer rim portion formed from a second metal alloy, the rim portion being metallurgically bonded to the body portion,
   wherein the body portion is more fatigue resistant than the rim portion and the rim portion is more wear resistant than the body portion.

2. The railroad wheel according to claim 1, further including a flange extending radially outward from at least one side of the rim portion for maintaining the railroad wheel on a railroad track.

3. The railroad wheel according to claim 2, wherein the flange is formed from the first and second alloys.

4. The railroad wheel according to claim 3, wherein an outer portion of the flange is formed from the first alloy and an inner, track-contacting portion of the flange is formed from the second alloy.

5. The railroad wheel according to claim 1, wherein the rim portion defines an annular surface having a width of about five inches.

6. The railroad wheel according to claim 5, wherein the rim portion has a thickness in the range from about 0.25 inch to about 1.00 inch along the annular surface.

7. The railroad wheel according to claim 1, wherein the first alloy is selected from the group consisting of about 0.6 to about 0.7 percent plain carbon steel, AISI 8620 steel, AISI 4140 steel, and AISI 4340 steel.

8. The railroad wheel according to claim 1, wherein the second alloy is selected from the group consisting of high speed tool steels, such as AISI M4 steel and T15 steel, 300 series stainless steel or nickel alloy matrix steels, PH series stainless steels, wear resistant tool steels such as crucible CPM 9V, 10V, and 15V vanadium carbide, ferretic stainless steels, D2 type chromium carbide, and CARPENTER AERMET 100.

9. The railroad wheel according to claim 1, wherein the second alloy includes carbide and/or oxide particles to increase wear resistance of the rim portion.

10. The railroad wheel according to claim 1, wherein the second alloy includes alloy particles selected from the group consisting of alloy steel, stainless steel, nickel alloy, chromium containing from about 10 to about 30 percent tool steel and/or stainless steel, and cobalt alloy for increasing traction of the railroad wheel with respect to a railroad track.

* * * * *

UNITED STATES PATENT AND TRADEMARK OFFICE
CERTIFICATE OF CORRECTION

PATENT NO. : 6,227,591 B1
DATED : May 8, 2001
INVENTOR(S) : Joseph C. Runkle

It is certified that error appears in the above-identified patent and that said Letters Patent is hereby corrected as shown below:

Column 6,
Line 18, reads "being metallurgically bonded to the body" should read -- being directly metallurgically bonded to and interfacing with the body --

Signed and Sealed this

First Day of January, 2002

Attest:

Attesting Officer

JAMES E. ROGAN
Director of the United States Patent and Trademark Office